United States Patent
Waldron et al.

(10) Patent No.: US 10,564,364 B2
(45) Date of Patent: Feb. 18, 2020

(54) OPTICAL FIBER ASSEMBLY

(71) Applicant: Molex, LLC, Lisle, IL (US)

(72) Inventors: Mark Waldron, Poplar Grave, IL (US); Wenzong Chen, Naperville, IL (US); Thomas R. Marrapode, Naperville, IL (US); Thomas D. Schiltz, Naperville, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/283,866

(22) Filed: Feb. 25, 2019

(65) Prior Publication Data

US 2019/0187383 A1    Jun. 20, 2019

Related U.S. Application Data

(62) Division of application No. 16/074,447, filed as application No. PCT/US2017/016044 on Feb. 1, 2017.

(Continued)

(51) Int. Cl.
*G02B 6/38* (2006.01)
*G02B 6/42* (2006.01)

(52) U.S. Cl.
CPC ......... *G02B 6/3825* (2013.01); *G02B 6/3849* (2013.01); *G02B 6/3885* (2013.01);
(Continued)

(58) Field of Classification Search
CPC .. G02B 6/3825; G02B 6/3897; G02B 6/3885; G02B 6/3849; G02B 6/3893
See application file for complete search history.

(56) References Cited

U.S. PATENT DOCUMENTS

| | | | |
|---|---|---|---|
| 6,688,780 B2 * | 2/2004 | Duran | G02B 6/3825 |
| | | | 385/76 |
| 7,837,395 B2 | 11/2010 | Lin et al. | |
| | (Continued) | | |

FOREIGN PATENT DOCUMENTS

| | | |
|---|---|---|
| JP | 5805344 B1 | 11/2015 |
| WO | 2017/136437 A1 | 8/2017 |

OTHER PUBLICATIONS

International Search Report and Written Opinion received for PCT application No. PCT/US2017/016044, dated Apr. 20, 2017, 10 pages.

(Continued)

*Primary Examiner* — Ryan A Lepisto
(74) *Attorney, Agent, or Firm* — Molex, LLC

(57) ABSTRACT

An optical housing assembly includes a housing member having a first face and a second face. The first face has a plurality of first cavities and the second face has a plurality of second cavities. Each of the first cavities is aligned with one of the second cavities and each of the first cavities and each of the second cavities has a housing locking member. Each of a plurality of first adapter inserts have a first mounting section inserted into one of the first cavities, a first receptacle configured to receive a first optical fiber connector therein, and a first connector latching member. Each of a plurality of second adapter inserts has a second mounting section inserted into one of the second cavities, a second receptacle, and a second connector latching member.

4 Claims, 20 Drawing Sheets

Related U.S. Application Data

(60) Provisional application No. 62/290,218, filed on Feb. 2, 2016.

(52) U.S. Cl.
CPC ......... *G02B 6/3893* (2013.01); *G02B 6/3897* (2013.01); *G02B 2006/4297* (2013.01)

(56) References Cited

U.S. PATENT DOCUMENTS

| | | |
|---|---|---|
| 8,628,254 B2 | 1/2014 | Lin et al. |
| 8,632,258 B2 | 1/2014 | Jibiki et al. |
| 8,821,031 B2 | 9/2014 | Lin et al. |
| 2005/0281509 A1 | 12/2005 | Cox et al. |
| 2007/0217749 A1 | 9/2007 | Jong et al. |
| 2013/0272671 A1 | 10/2013 | Jones |
| 2015/0078710 A1 | 3/2015 | Sato |
| 2015/0093076 A1 | 4/2015 | Tanaka et al. |

OTHER PUBLICATIONS

International Preliminary Report on Patentability received for PCT application No. PCT/US2017/016044, dated Aug. 16, 2018, 9 pages.

\* cited by examiner

OPTICAL FIBER ASSEMBLY

CROSS-REFERENCE TO RELATED APPLICATION

This divisional application claims priority to U.S. application Ser. No. 16/074,447 filed Aug. 1, 2018, entitled "OPTICAL FIBER ASSEMBLY," which claims priority to International Application No. PCT/US2017/016044, filed Feb. 1, 2017, which further claims priority to U.S. Provisional Application No. 62/290,218 filed Feb. 2, 2016, which are hereby incorporated by reference in their entirety.

TECHNICAL FIELD

The present disclosure relates generally to optical fiber assemblies and, more particularly, to an optical fiber assembly with for mating with optical fiber cable assemblies.

BACKGROUND

Upon removing an optical fiber connector assembly from a housing or another component, light may still be transmitted through the receptacle vacated by the removal of connector assembly. Accordingly, covers and shields have been used to deflect any light that may be transmitted through the vacated receptacle. Such covers and shields have generally been relatively complex, costly, or less robust than desired.

Optical fibers are often secured within ferrules that carry and accurately position a group of optical fibers. Ferrules from mating components or connector assemblies may be aligned to interconnect one assembly with another. Such ferrules are often either permanently mounted within a connector assembly or housing or require special tools to facilitate removal of the ferrules from the assembly or housing.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In an aspect, an optical housing assembly includes a housing member having a first face and a second face. The first face has a plurality of first cavities and the second face has a plurality of second cavities. Each of the first cavities is aligned with one of the second cavities and each of the first cavities and each of the second cavities has a housing locking member. The housing member includes wall with an opening between each pair of aligned first and second cavities. Each of a plurality of first adapter inserts have a first mounting section inserted into one of the first cavities, a first receptacle configured to receive a first optical fiber connector therein, and a first connector latching member configured to interact with a first latching structure of the first optical fiber connector. Each of a plurality of second adapter inserts has a second mounting section inserted into one of the second cavities, a second receptacle configured to receive a second optical fiber connector therein, and a second connector latching member configured to interact with a second latching structure of the second optical fiber connector. Each of the first adapter inserts and each of the second adapter inserts have an adapter insert locking member associated with their respective mounting sections with each adapter insert locking member being configured to interact with one of the housing locking members to lock the adapter insert in one of the receptacles of the housing.

DETAILED DESCRIPTION

Figure 1:
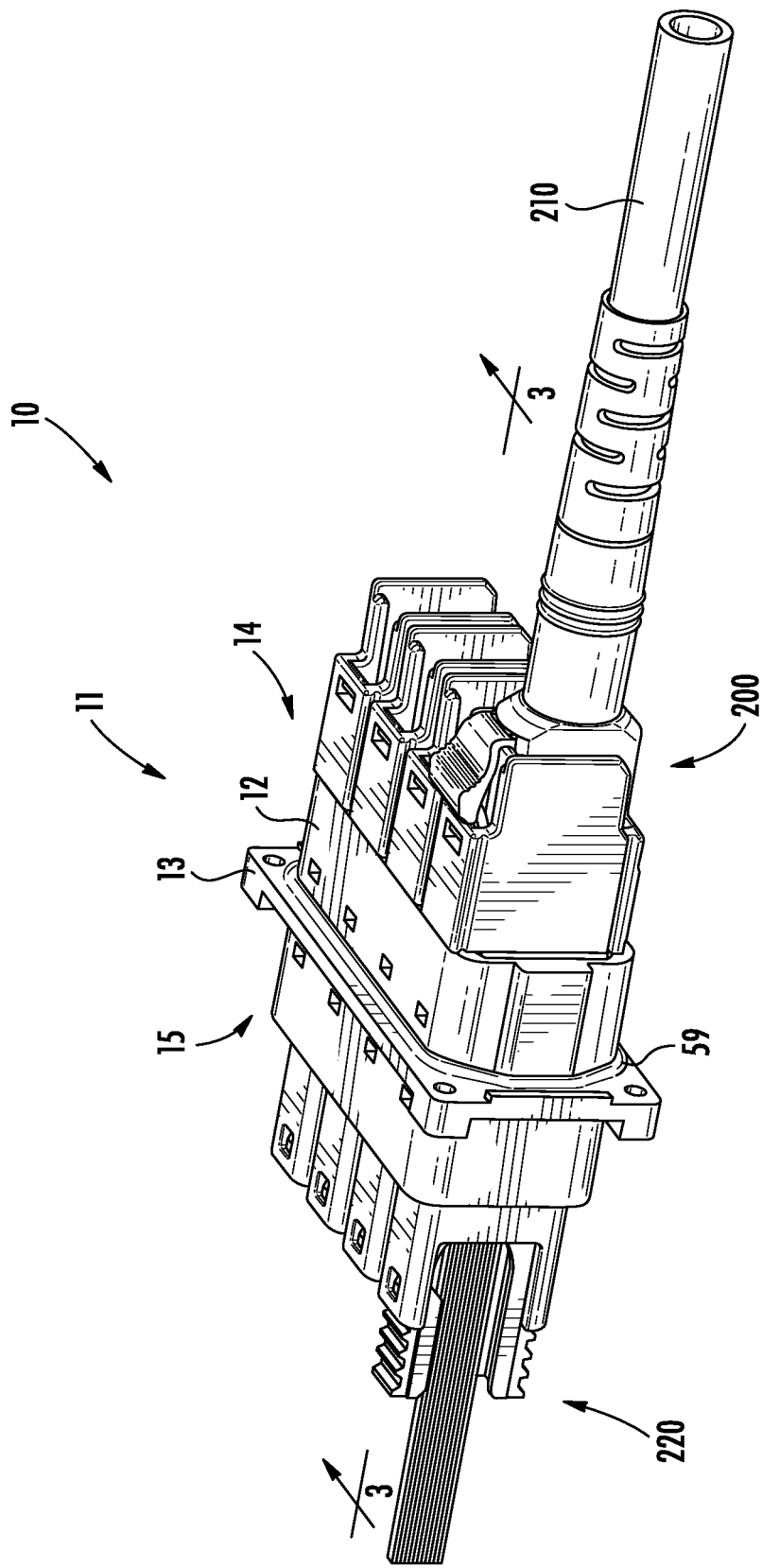
FIG. 1 is a perspective view of an optical fiber assembly.
Figure 2:
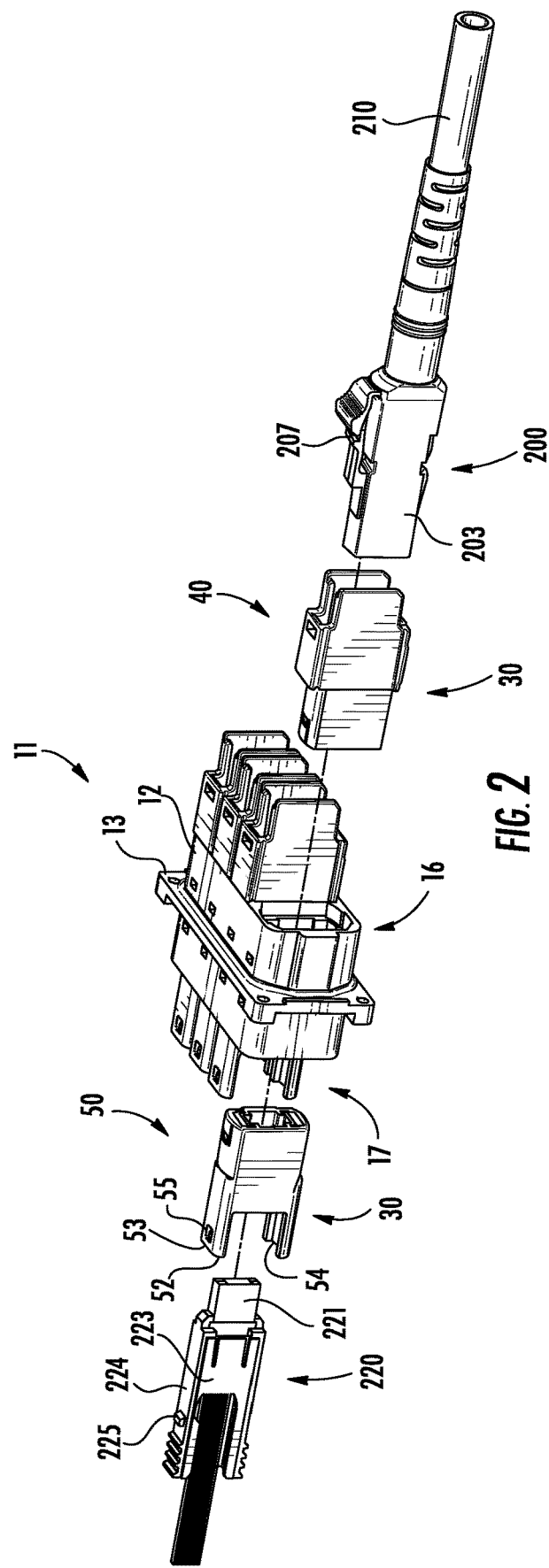
FIG. 2 is an exploded perspective view of the optical fiber assembly of FIG. 1.

Referring to FIGS. 1-5, an optical fiber assembly 10 is depicted. Optical fiber assembly 10 includes an optical housing assembly 11 with a first optical fiber connector assembly or module 200 and a second optical fiber connector assembly or module 220 connected thereto. The optical housing assembly 11 includes a housing member or body 12 with a generally centrally located flange 13 configured to be mounted to a panel (not shown). The housing member 12 has a first projecting face 14 and an oppositely facing second projecting face 15. The first face 14 has a plurality of first cavities 16 and the second face 15 has a plurality of second cavities 17 aligned with the first cavities. Referring to FIG.

5, a central wall 18 defines the inner or end surface of pairs of aligned first and second cavities 16, 17 and includes a rectangular opening 19 that connects the aligned first and second cavities. The opening 19 may be dimensioned to permit at least a portion of a ferrule from either the first connector assembly 200 or the second connector assembly 220 to pass or extend therethrough.

Each of the first and second cavities 16, 17 may be identically configured and only one is described herein. The cavities 16, 17 have first and second opposite side walls 20, 21 and generally arcuate upper and lower walls 22 that connect the first and second sidewalls. The first sidewall 20 maybe generally planar and the second sidewall 21 may have a polarization notch or structure 23 therein to prevent insertable adapter inserts 30 from being inserted into the cavities in an incorrect orientation. The upper and lower walls 22 include an opening or window 24 for locking the adapter inserts 30 therein. The upper and lower walls 22 may also include a recess 25 including a ramp 26 aligned with the opening 24 to assist in inserting the adapter inserts 30 into the cavities.

Optical housing assembly 11 includes a plurality of insertable adapter inserts 30 that are configured to be inserted into each of the first and second cavities 16, 17. Each adapter insert 30 includes a mounting section 31 configured to be lockingly received within one of the first and second cavities 16, 17. The mounting section 31 includes a first generally planar sidewall 32 to be positioned adjacent first sidewall 20 of cavities 16, 17 and a second stepped sidewall 33 configured with a projection 34 that extends into the polarization notch 23 in second sidewall 21.

Upper and lower arcuate surfaces 35 may be identically configured and generally match the upper and lower walls 22. Each of the upper and lower surfaces 35 further includes an adapter insert locking member configured as a locking projection 36. During assembly, the housing insertion end 37 of an adapter insert 30 is inserted into one of the cavities 16, 17 and the locking projection 36 engages the ramp 26 which causes the adapter insert to deform until the projection is aligned with the opening 24 and springs back into the opening to lock the adapter insert 30 in one of the cavities.

Each adapter insert 30 further includes a receptacle 38 configured in any desired manner to receive therein an optical fiber connector assembly or module and a locking portion 39 configured to lock the connector assembly within the receptacle. In some embodiments, the locking portion 39 may be positioned outside of the cavities 16, 17 and positioned within the cavities in other embodiments. The receptacle 38 may extend entirely through the adapter insert 30 from the locking portion 39 to the housing insertion end 37 and thus may be positioned both within and outside of the cavities 16, 17 depending on the configuration of the locking portions 39.

Figure 5:
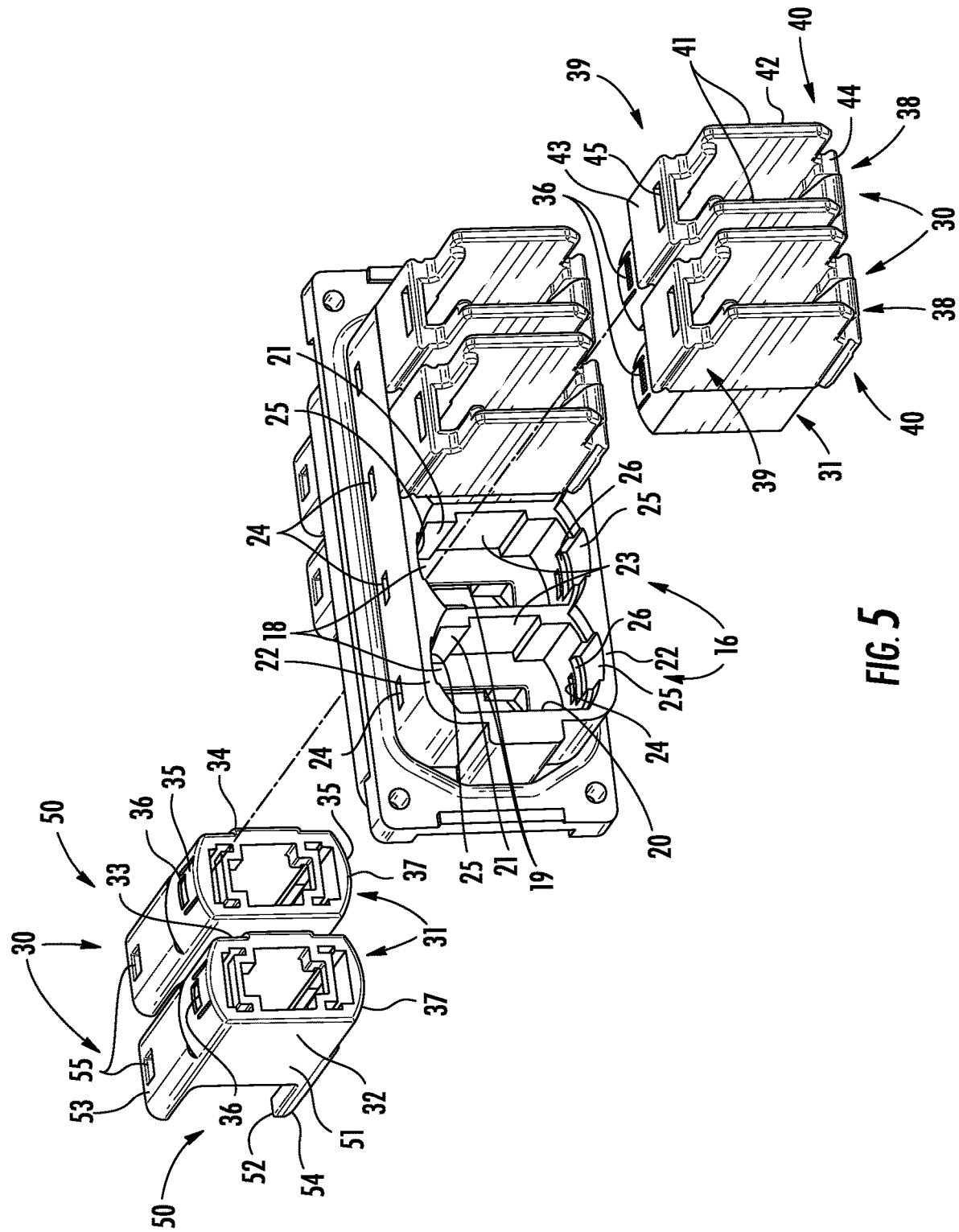
FIG. 5 is a partially exploded perspective view of the optical housing assembly of FIG. 1 but from a different perspective.

In one example, a first insertable adapter insert 40 may be inserted into each first cavity 16. Each first adapter insert 40 is configured to receive a first optical fiber connector assemblies 200 therein. As best seen in FIG. 5, the first adapter inserts 40 may be configured to receive an MXC™ optical fiber connector assemblies 200. The locking portion 39 includes a pair of spaced apart vertical sidewalls 41 that extend from the mounting section 31 to a distal end 42 of the adapter insert 40. Upper and lower walls 43, 44 connect the vertical sidewalls 41 at a location spaced from the distal end 42. The upper wall 43 may include an opening or recess 45 for lockingly receiving the locking projection 207 of a mating MXC™ optical fiber connector assembly 200.

Figure 3:
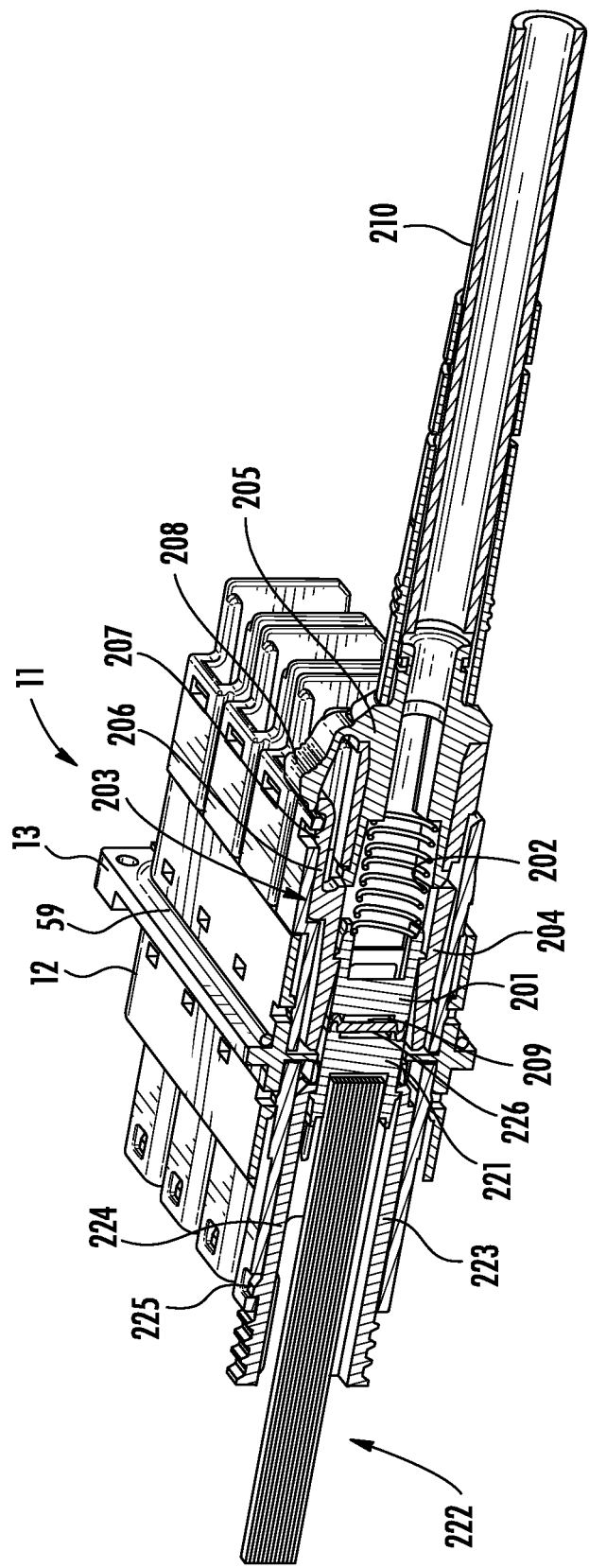
FIG. 3 is a sectional view taken generally along line 3-3 of FIG. 1.
Figure 4:
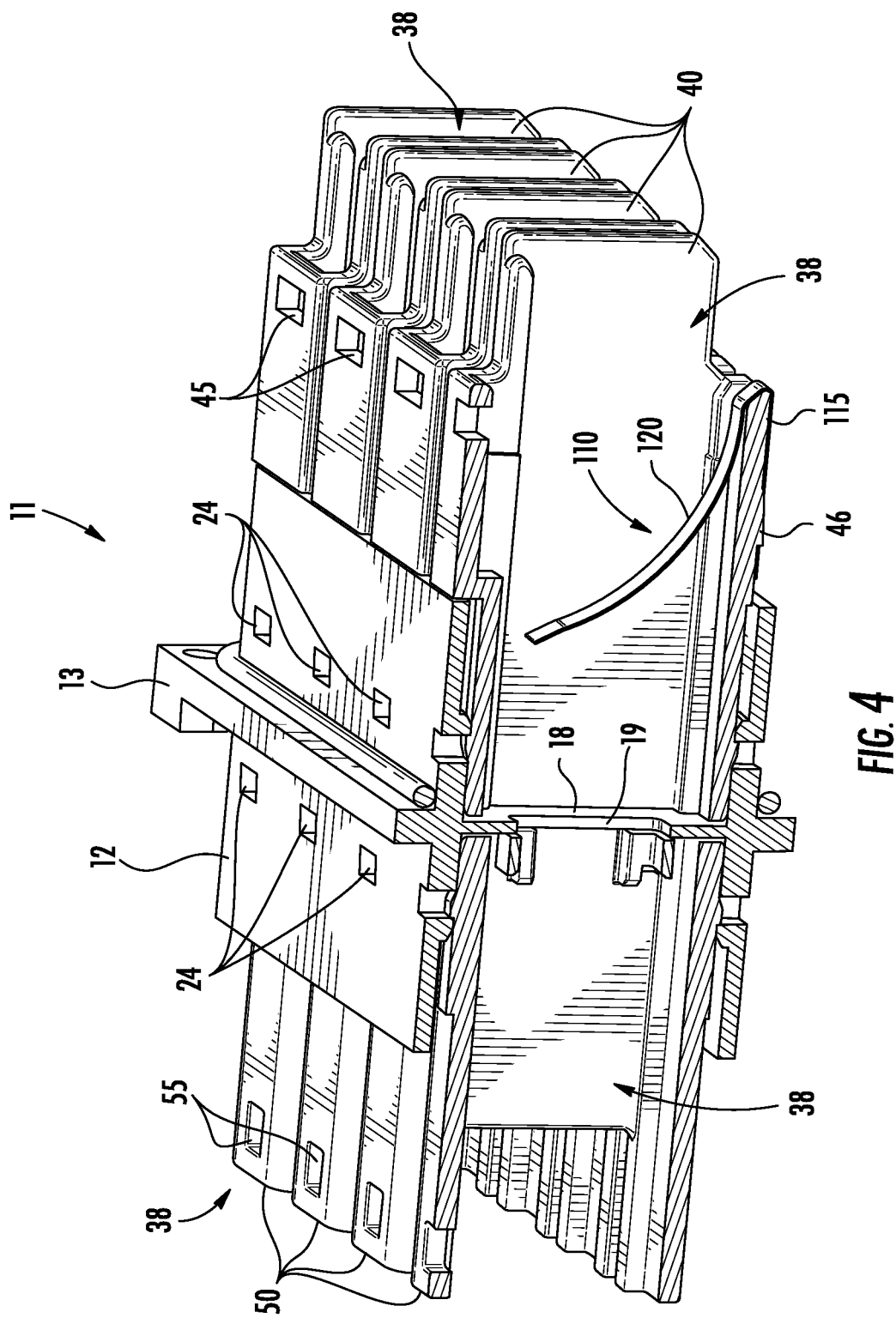
FIG. 4 is a sectional view similar to that of FIG. 3 but with the cable assemblies removed.

As may be seen in FIG. 3, the MXC™ optical fiber connector assembly 200 includes a ferrule 201, having a plurality of optical fibers (not shown) therein, that is engaged by a biasing member such as a spring 202 and both the ferrule and spring are contained within a housing body 203 formed of a first component 204 and a second component 205. The first component 204 includes a deflectable locking arm 206 with a locking projection 207 thereon. The second component 205 includes a manually engageable deflectable cantilevered arm 208 that interacts with the locking arm 206 to release unlatch the first connector assembly 200. The optical fibers are positioned within optical fiber cable 210. In one embodiment, a lens structure 209 having a plurality of beam expanding elements or lenses (not shown) may be integrally formed at the end of the ferrule 201 and aligned with the optical fibers. In embodiments, the ferrule 201 may include a separate lens plate (not shown) mounted on the end of the ferrule or may not include any type of lens structure.

In a second example, a second insertable adapter insert 50 may be inserted into each second cavity 17 and each second adapter insert is configured to receive one of the second optical fiber connector assemblies 220 therein. As depicted, the second adapter inserts 50 may be configured to receive HBMT™ optical fiber connector assemblies or modules 220 therein. Accordingly, the locking portion 39 of second adapter insert 50 includes a pair of spaced apart vertical sidewalls 51 that extend from the mounting section 31 only part way to a distal end 52 of the adapter insert. Upper and lower walls 53, 54 connect the vertical sidewalls 51 and extend to the distal end 52 of the second adapter insert 50. The upper wall 52 may include an opening or recess 55 for lockingly receiving the locking projection 225 of a mating HBMT™ optical fiber connector module 220.

The HBMT™ optical fiber connector assembly 220 (FIG. 2) includes a ferrule 221 having a plurality of optical fibers 222 therein and is retained within a one-piece housing 223 with a resilient cantilevered spring arm 224 having a locking projection 225 thereon. A lens plate 226, having a plurality of beam expanding elements or lenses (not shown), may be mounted on the end surface of the ferrule 221 and aligned with the optical fibers.

Figure 6:
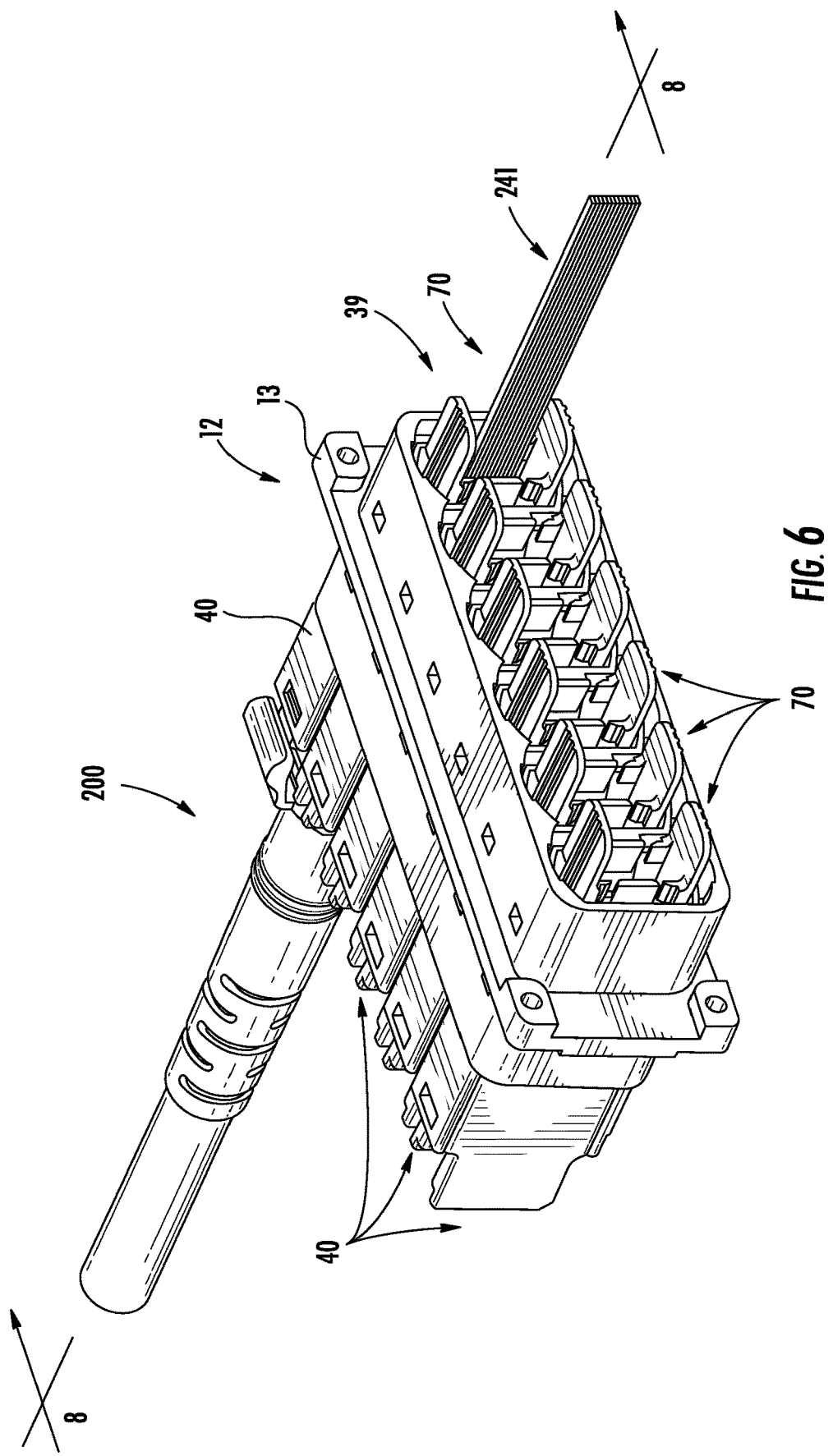
FIG. 6 is a perspective view of a second embodiment of an optical fiber assembly.
Figure 7:
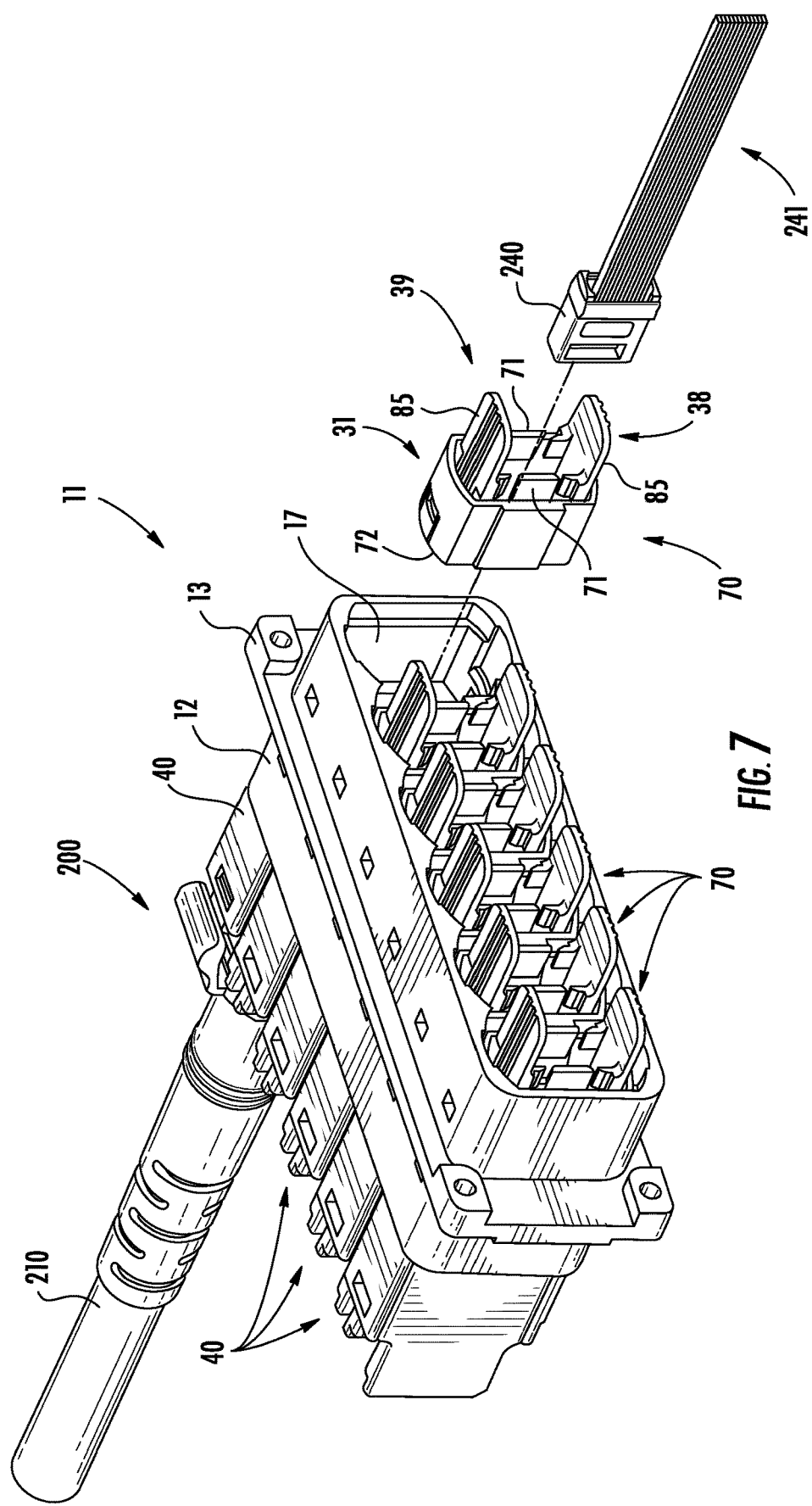
FIG. 7 is a view similar to FIG. 6 but with certain components exploded therefrom.
Figure 8:
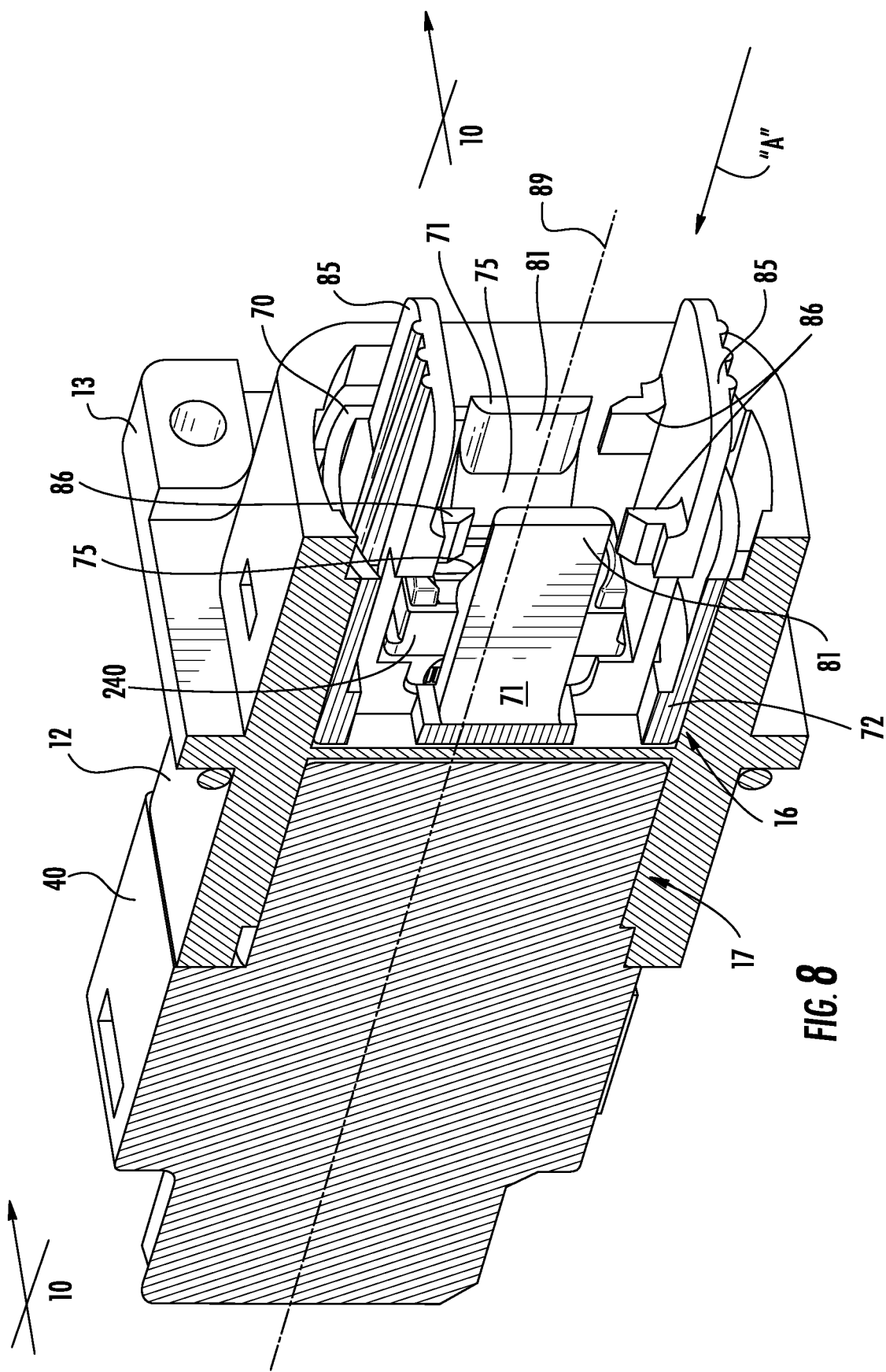
FIG. 8 is an enlarged sectional view taken generally along line 8-8 of FIG. 6 but with the array of optical fibers removed from the ferrule and the mating cable assembly also removed.
Figure 9:
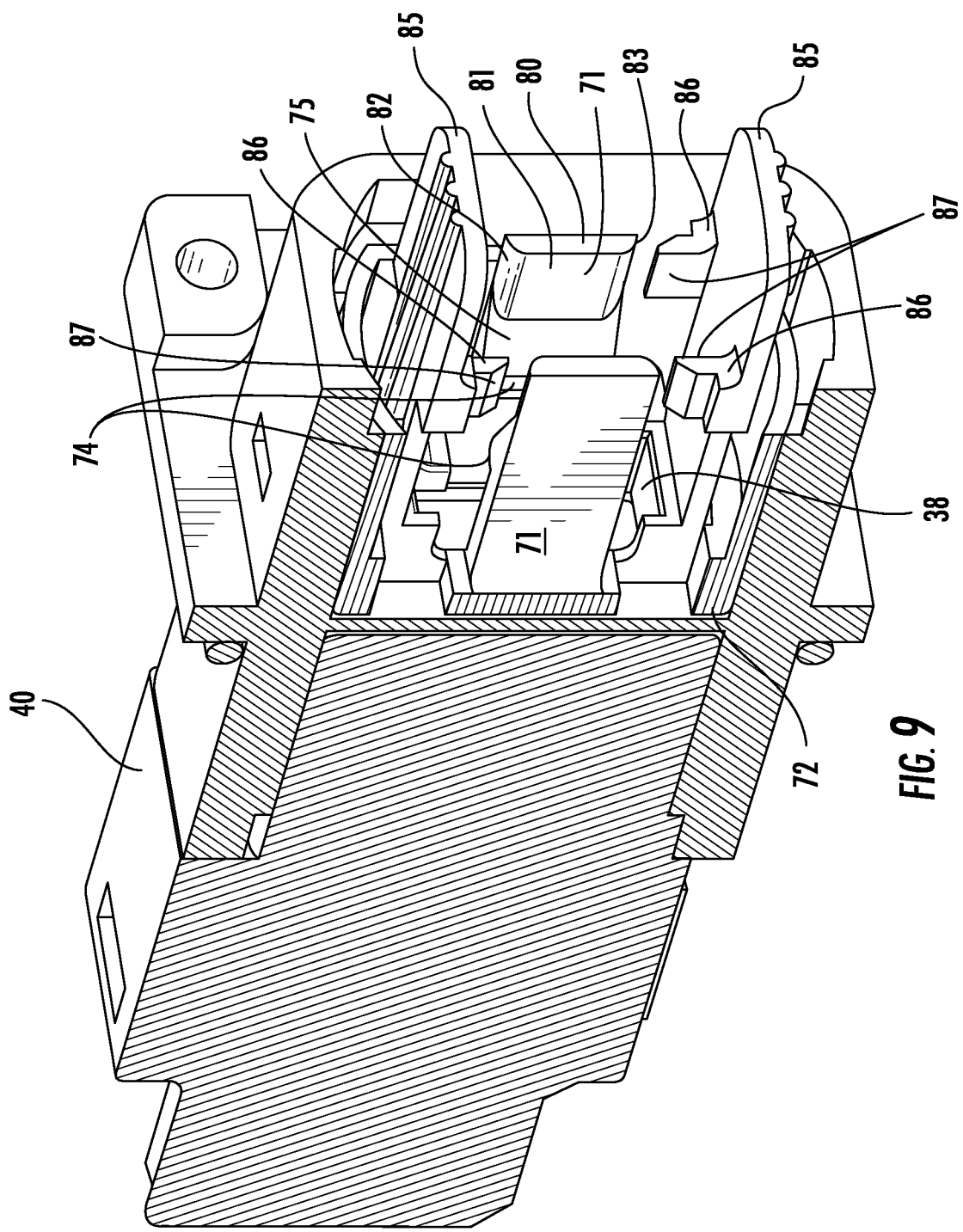
FIG. 9 is a view similar to FIG. 8 but with the ferrule removed.
Figure 10:
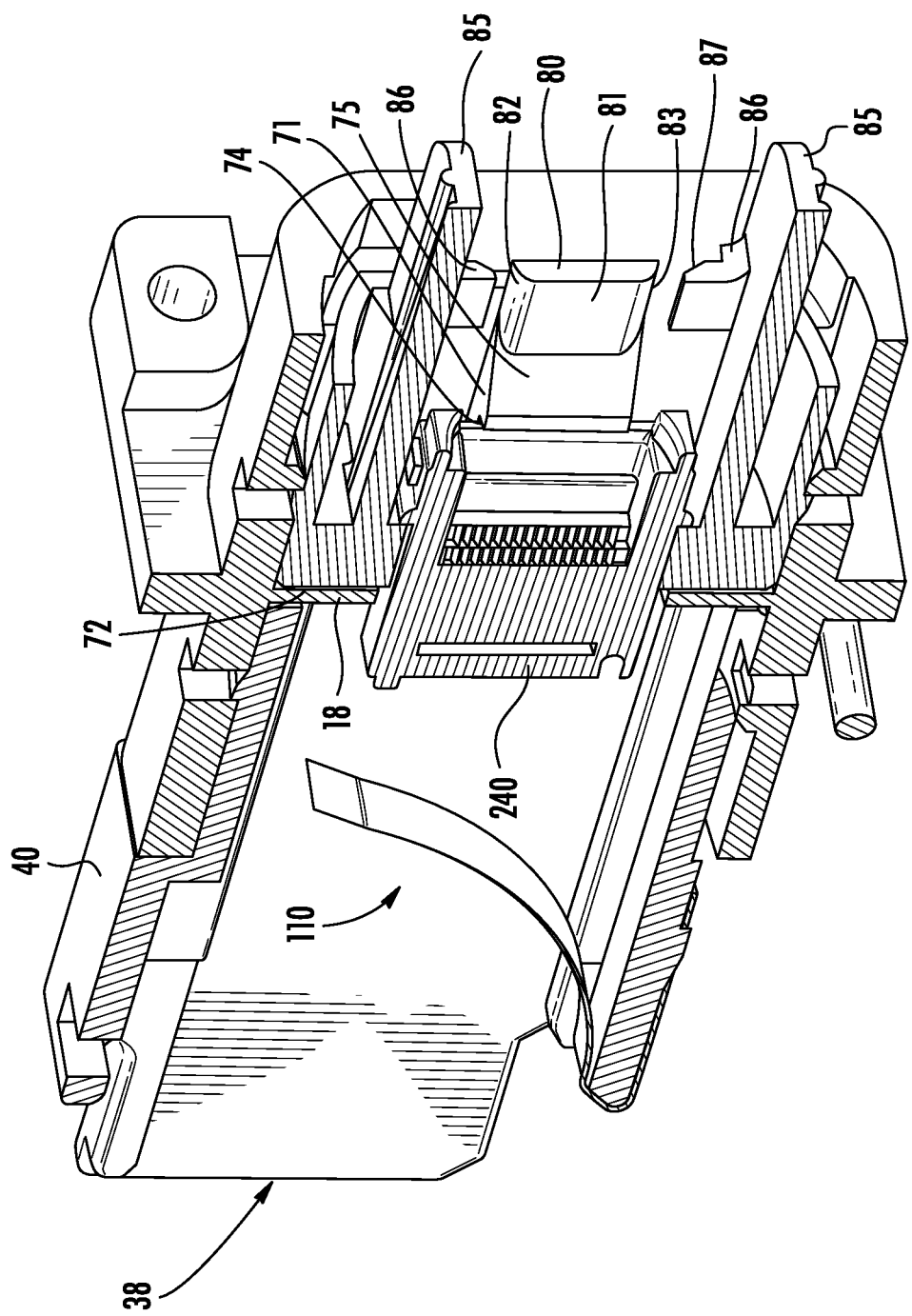
FIG. 10 is an enlarged sectional view taken generally along line 10-10 of FIG. 8.
Figure 11:
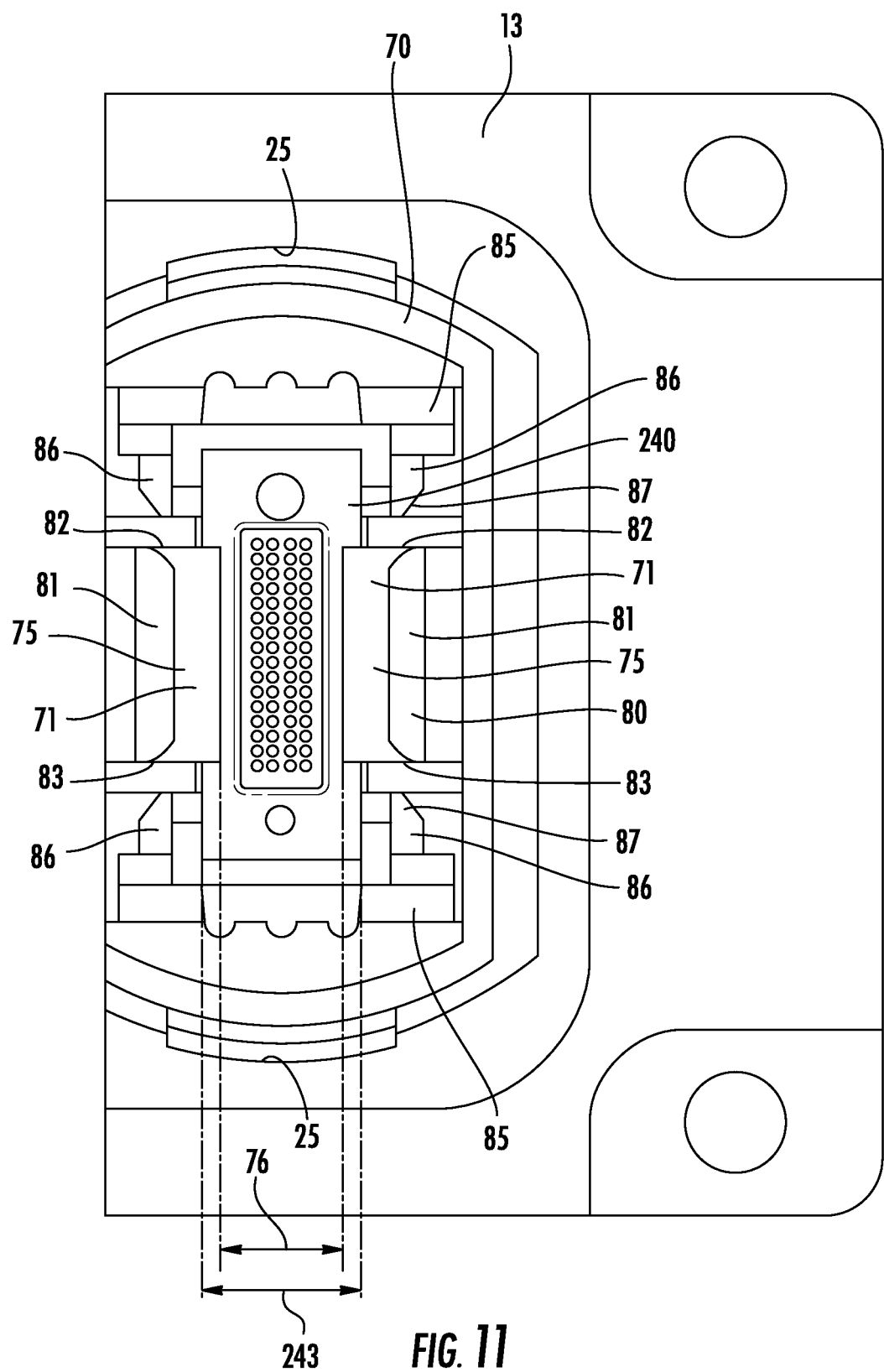
FIG. 11 is an end view of the sectional view of FIG. 8.
Figure 12:
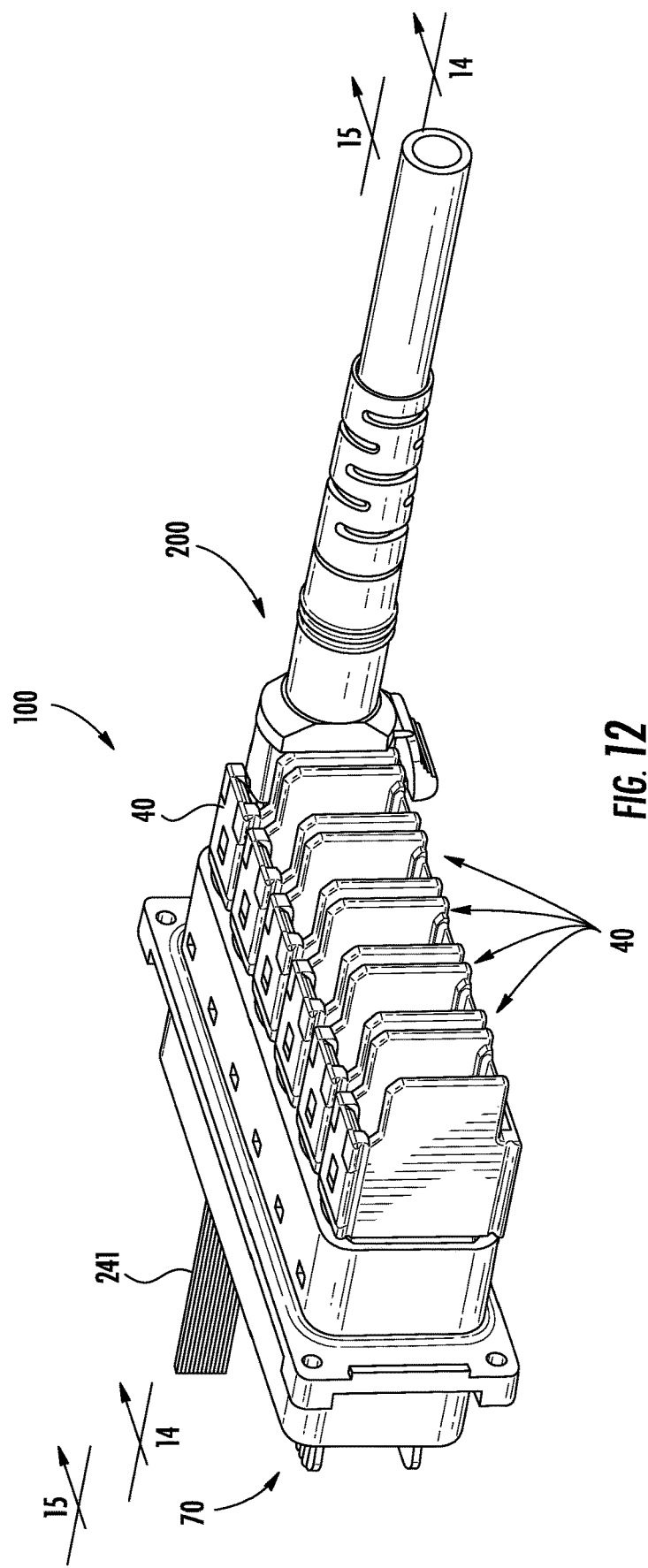
FIG. 12 is a perspective view of a third embodiment of an optical fiber assembly.
Figure 13:
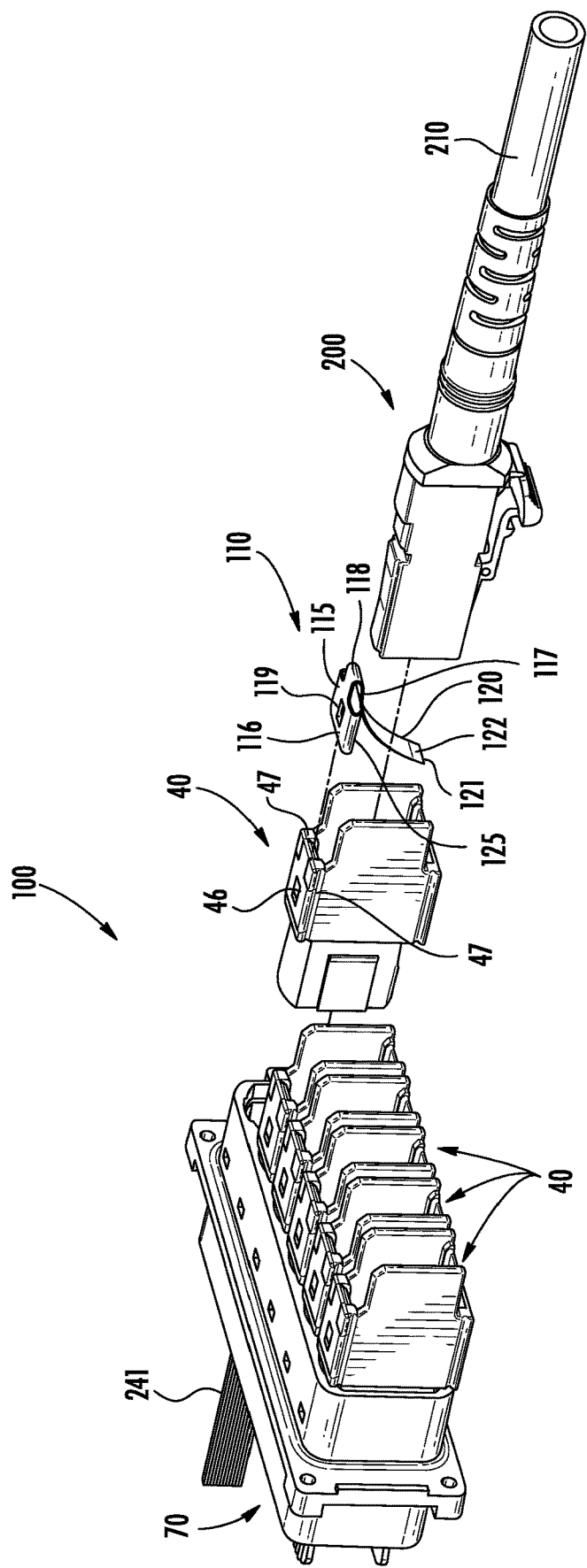
FIG. 13 is a view similar to FIG. 12 but with certain components exploded therefrom.
Figure 14:
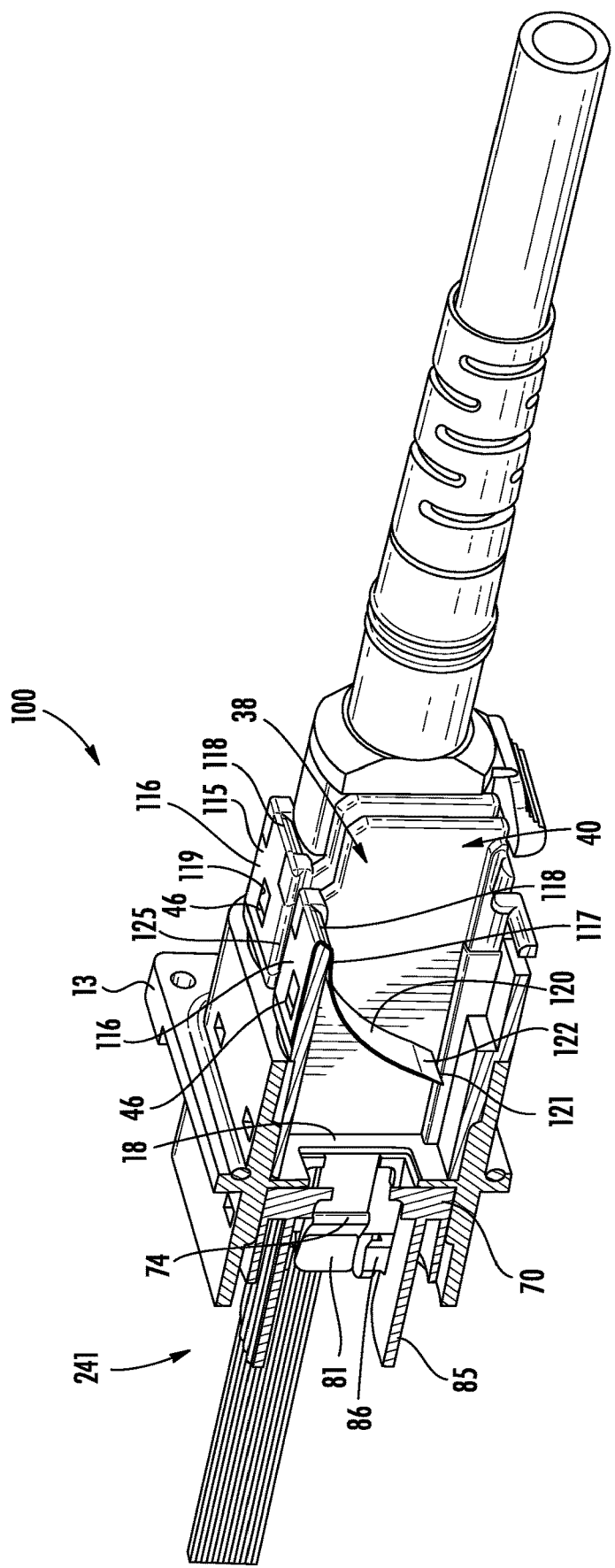
FIG. 14 is a sectional view taken generally along line 14-14 of FIG. 12.

In still another example best seen in FIGS. 6-7, the locking portion 39 of a third insertable adapter insert 70 may be positioned entirely or almost entirely within one of the first or second cavities 16, 17. In other words, such an adapter insert 70 may include a mounting section 31 that engages the surface of the first or second cavities 16, 17 to position and retain the adapter insert and a locking portion 39 that is located within or surrounded by the mounting section 31 so that the locking portion does not extend significantly out of the cavities 16, 17.

Although configured with the first adapter inserts 40 being identical and the second adapter inserts 50 being identical, each of the first adapter inserts and each of the second adapter inserts do not need to be identical. Utilizing housing member 12 with a plurality of identically configured first and second cavities 16, 17 and configuring the adapter inserts with identical mounting sections 31 (regardless of the configuration of their receptacles 38 and locking portions 39) permits adapter inserts of any configuration to be used with a generic housing member 12 to form optical housing assembly 11.

Housing member 12 and adapter inserts 30 may be formed of any desired material. In one example, the housing member 12 may be formed of an electrically conductive material such as a die cast metal or a plated polymer or resin material to assist in sealing or reducing electromagnetic emissions from a panel. In such case, it may be desirable to include an electromagnetic sealing gasket 59 along one of the faces of the flange 13. In one example, the adapter inserts 30 may be formed of a material such as a polymer or resin.

Referring to FIGS. 6-11, second adapter inserts 50 are replaced with third adapter inserts 70 within housing member 12. Third adapter insert 70 may be configured to releasably receive a ferrule 240, having a plurality of optical fibers 241 positioned therein, without the need for a connector housing such as housing body 203 of connector assembly 200 or housing 223 of connector assembly 220. The locking portion 39 of adapter insert 70 is generally surrounded by the mounting section 31. In one embodiment, a lens structure (not shown) having a plurality of beam expanding elements or lenses (not shown) may be integrally formed at the end of the ferrule 240 and aligned with the optical fibers 241. In embodiments, the ferrule 201 may include a separate lens plate (not shown) mounted on the end of the ferrule or may not include any type of lens structure. Although the assembly of the ferrule 240 and the optical fibers 241 does not include a housing, the assembly thereof may still be referred to herein as a third optical fiber connector assembly 242.

The locking portion 39 is thus operative to secure an optical fiber connector assembly 242 without a housing. The locking portion 39 includes a pair of spaced apart, resilient cantilevered ferrule retention arms 71 that extend away from the housing insertion end 72. Each retention arm 71 includes a locking shoulder 74 that extends generally perpendicularly from the ferrule insertion direction "A" and towards the other retention arm. A ramp or tapered surface 75 leads to the locking shoulder 74 in the insertion direction "A" from the ferrule insertion end 73 towards the housing insertion end 72. The retention arms 71 are spaced apart so that the distance 76 between the locking shoulders 74 is less than the width 243 of the ferrule 240 (FIG. 11) to retain the ferrule within the receptacle 38 of adapter insert 70. The distal end 80 of the retention arms 71 includes a forward projection 81 that extends from the ramp 75 and away from the locking shoulder 74. The upper and lower surfaces 82, 83 of the forward projection 81 may be curved or tapered so each may act as a latch cam surface.

The adapter insert 70 also includes ferrule release structure in the form of a pair of spaced apart, resilient manually-manipulatable cantilevered release arms 85 that extend away from the housing insertion end 72. Each release arm 85 includes a pair of L-shaped ferrule release projections 86 that extend vertically away from the release arm and towards the retention arms 71. The distal end 87 of the release projections 86 may be curved or tapered so that each may act as a release cam surface. While the adapter insert 70 is depicted with a pair of release arms 85, in some embodiments, the adapter insert may include only a single release arm 85.

The retention arms 71 are movable between a retention position and a release position. At the retention position, the retention arms are positioned with the distance 76 between the locking shoulders 74 being less than the width 243 of the ferrule 240 in order to retain the ferrule within the receptacle 38. In one example, the retention position may coincide with the undeflected state or position of the retention arms 71. In another example, the retention arms 71 may be slightly deflected when at the retention position. At the release position, the retention arms 71 are spaced apart so that the distance 76 between the locking shoulder 74 is greater than the width 243 of the ferrule 240 and thus the ferrule may be removed from (or inserted into) the receptacle 38.

The release arms 85 are movable between a first operative undeflected position and a second operative deflected position. At the undeflected position, the distal ends 87 of the respective release projections 86 may be spaced from the upper and lower surfaces 82, 83 of the forward projection 81. At the deflected position, the distal ends 87 of the release projections 86 engage the upper and lower surfaces 82, 83 of the forward projection 81 to force the retention arms to their release positions.

To insert a ferrule 240 into the receptacle 38, a ferrule having a plurality of optical fibers 241 terminated thereto may be slid along insertion axis 89 until the ferrule engages the ramp 75 of each retention arm 71. As the ferrule 240 is inserted further, the ferrule will slide along the ramps 75 which causes the retention arms 71 to deflect from their undeflected position (which may coincide with the retention position) to an insertion position at which the locking shoulders 74 are wider than the width 243 of the ferrule 240 (which may be approximately equal to the release position). Continued insertion of the ferrule 240 will result in the ferrule sliding along the insertion axis 89 past the locking shoulders 74 at which point the retention arms 71 will spring back to their retention position to retain the ferrule within the receptacle 38.

Although the locking portion 39 including retention arms 71 and the ferrule release portion configured as release arms 85 are depicted as part of third adapter insert 70, in another embodiment, the locking and release structures may be integrally formed as part of a board or panel mountable housing without insertable adapter inserts (i.e., a housing in which the receptacle 38 and the locking portion 39 are integrally formed as part of the housing). In still another embodiment, the locking and release structures may be integrally formed as part of a cable assembly housing so that the ferrule may be readily removed from the housing without the need for additional tools.

In some applications, it may be desirable to include a structure to block or prevent light from exiting the optical housing assembly 11 when an optical fiber connector assembly such as first connector assembly 200 is not inserted into one of the first cavities 16 but a second optical fiber connector assembly 220 or another light source is operatively connected to an optical housing assembly. Referring to FIGS. 12-17, optical fiber assembly 100 includes a plurality of first adapter inserts 40 mounted along the first face 14 with a first optical fiber connector assembly 200 inserted in one first cavity 16 and a plurality of third adapter inserts 70 mounted along the second face 15 with a third optical fiber connector assembly 200 inserted in a second cavity 17. It should be noted that the optical fiber assembly 100, and thus the adapter inserts and cable assemblies thereof, are inverted relative to the optical fiber assembly 10 of FIGS. 1-5.

Adapter insert 40 is depicted with a flexible optical shield member 110 that is positioned within the receptacle 38 and prevents light passing through the third optical fiber connector assembly 243 from directly exiting the optical fiber assembly 100 when the first optical fiber connector assembly 200 is not inserted into the first cavity 16. More specifically, optical shield member 110 includes a mounting section 115 and a flexible arm 120. The mounting section 115 may be generally J-shaped with a planar, relatively long first leg 116, a relatively short second leg 117, and a curved or bight portion 118 connecting the first and second legs. The first leg 116 has a locking window or aperture 119 therein into which a locking projection 46 of the second connecting wall 44 extends to assist in securing the optical shield member 110 to the adapter insert 40. Curved sidewalls 125 may extend along the edges of the first leg 116 and interact with channels 47 along the second connecting wall 44 to further assist in securing the optical shield member 110 to adapter insert 40.

The flexible arm 120 extends from the mounting section 115 at an angle and has a generally arcuate shape. If desired, the distal end 121 spaced from the mounting section 115 may include a flat section 122. As depicted, the flexible arm 120 is generally concave relative to the direction of insertion of the first connector assembly 200. As such, the optical shield member 110 is shaped generally like the number "7."

Figure 15:
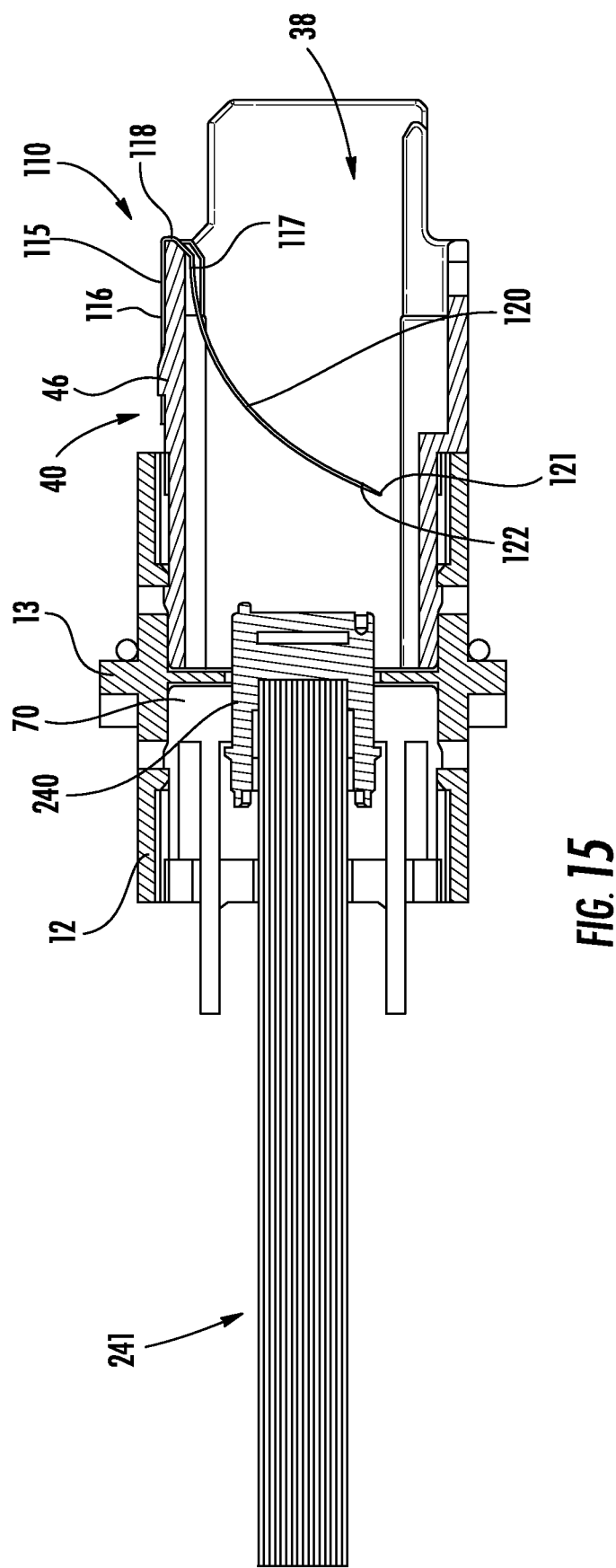
FIG. 15 is a sectional view taken generally along line 15-15 of FIG. 12 but with a cable assembly removed.
Figure 16:
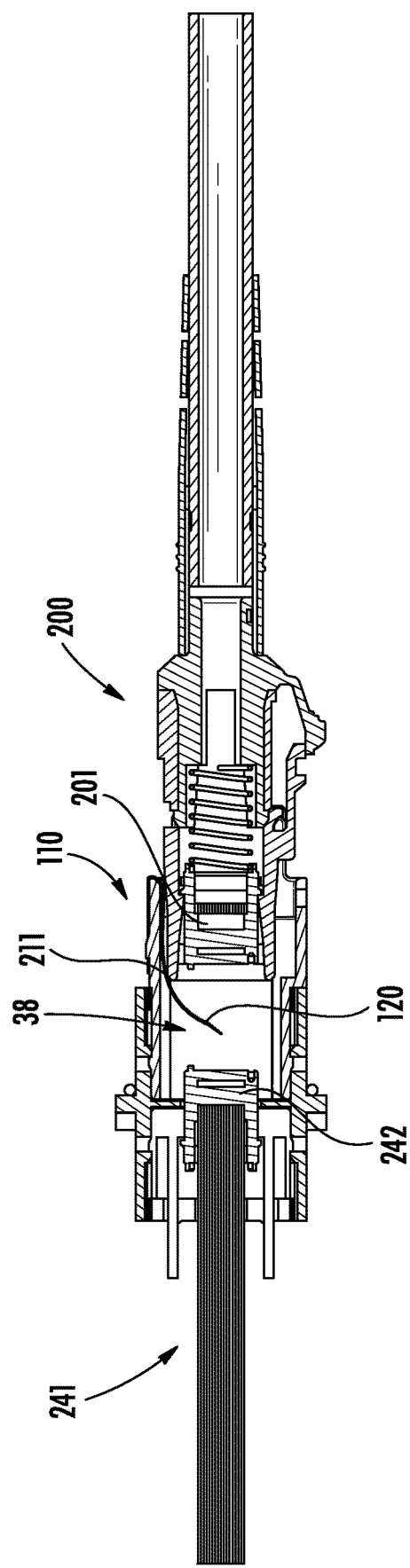
FIG. 16 is a view similar to FIG. 15 but with a cable assembly partially inserted into a receptacle.
Figure 17:
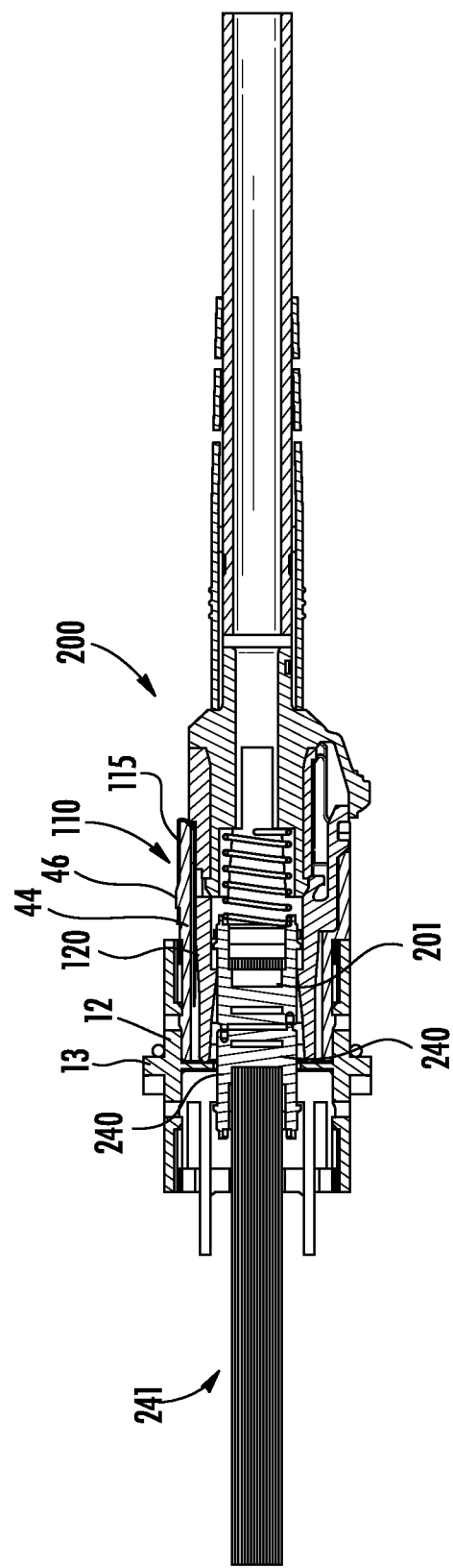
FIG. 17 is a view similar to FIG. 16 but with the cable assembly fully inserted into the receptacle.

An insertion sequence of a first connector assembly 200 into receptacle 38 of adapter insert 40 is depicted in FIGS. 15-17 to illustrate the deflection of the flexible arm 120. Referring to FIG. 15, light traveling along the optical fibers 241 of the third optical fiber connector assembly 242 may exit the optical fibers from the lens plate of ferrule 240. However, since the flexible arm 120 of the optical shield member 110 extends across the receptacle 38, the light exiting the optical fibers 241 at the ferrule 240 intersects with and is dispersed by the flexible arm and thus may not directly exit the receptacle.

As the first optical fiber connector assembly 200 is inserted into the receptacle 38 (FIG. 16), the leading edge 211 of the housing body 203 adjacent the mounting section 115 contacts the flexible arm 120 and causes the arm to deflect from its undeflected position, at which it extends across the receptacle 38, to its fully deflected position, at which it extends along a wall of receptacle 38 adjacent the second connecting wall 44. Due to the arcuate shape of the flexible arm 120, stresses within the optical shield member 110 may be distributed over a relatively large area and not concentrated at one location or area. This stress distribution may decrease the likelihood of over-stressing the optical shield member 110 and decrease the inelastic deformation of the flexible arm 120. By decreasing the inelastic deformation of the flexible arm 120, the flexible arm is more likely to return to its original position extending across the receptacle 38 and blocking the light emitting from ferrule 240 after a plurality of mating and unmating operations of the first optical fiber connector assembly 200.

Optical shield member 110 may be formed of any desired resilient material. In one application, optical shield member 110 may be formed of a sheet-metal material such as stainless steel.

To mount the optical shield member 110 on adapter insert 40, the shield member may be moved relative to the adapter insert so that the second connecting wall 44 slides between the first and second legs 116, 117 and the sidewalls 125 slide within channels 47 until the locking projection 46 is aligned with and passes through the locking window 119 on the first leg 116.

Various alternative configurations are contemplated. For example, the optical shield member 110 is depicted as an individual element to be mounted to each adapter insert 40. In some applications, a housing may include a plurality of receptacles that are integrally formed as part of the housing so that the shield members 110 may be mounted directly to the housing rather than to the adapter inserts. Still further, the optical shield members 110 may be interconnected to form a larger shield member that has a plurality of flexible arms 120 with each arm operative to block or redirect light from one light source or through one receptacle 38.

Figure 18:
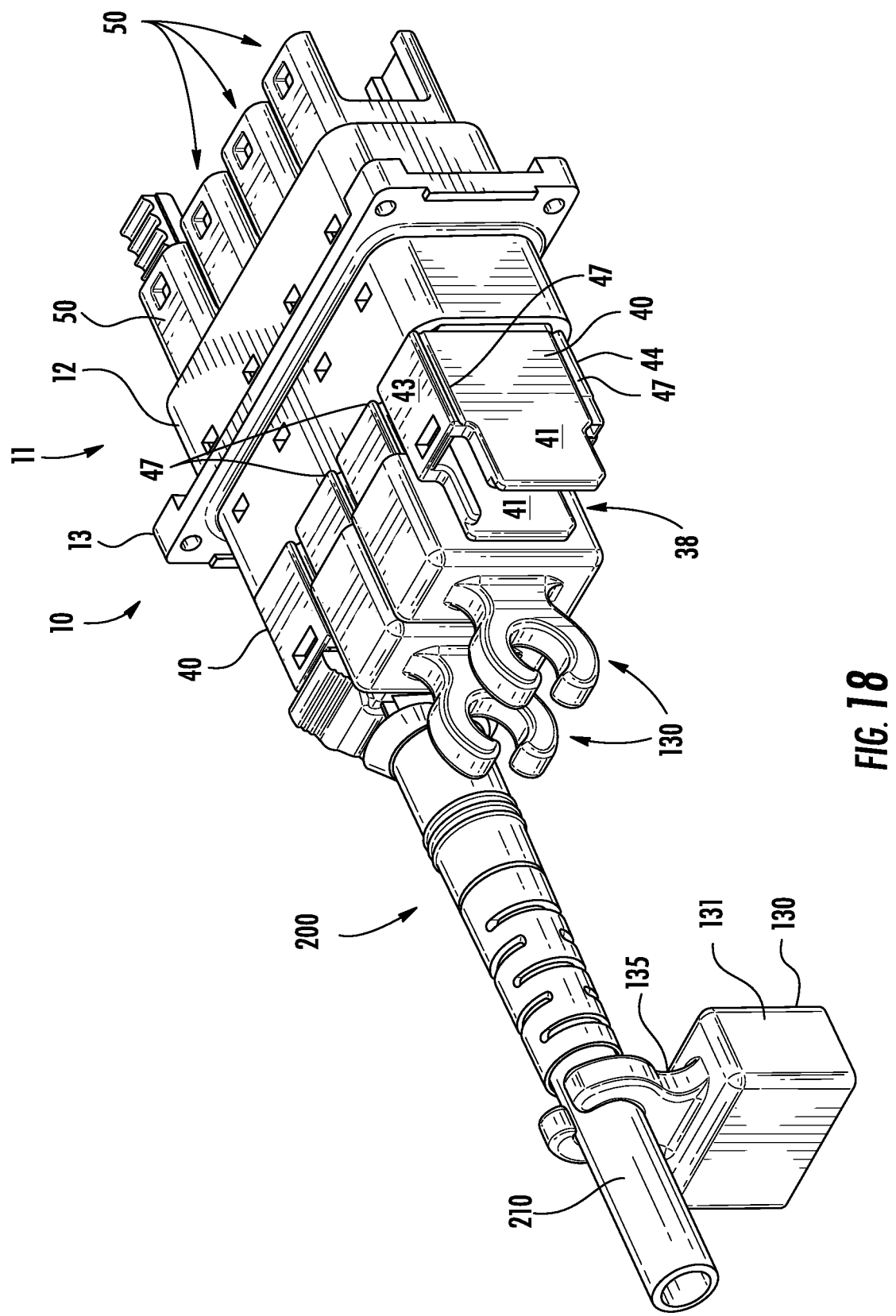
FIG. 18 is a perspective view of a fourth embodiment of an optical fiber assembly.
Figure 19:
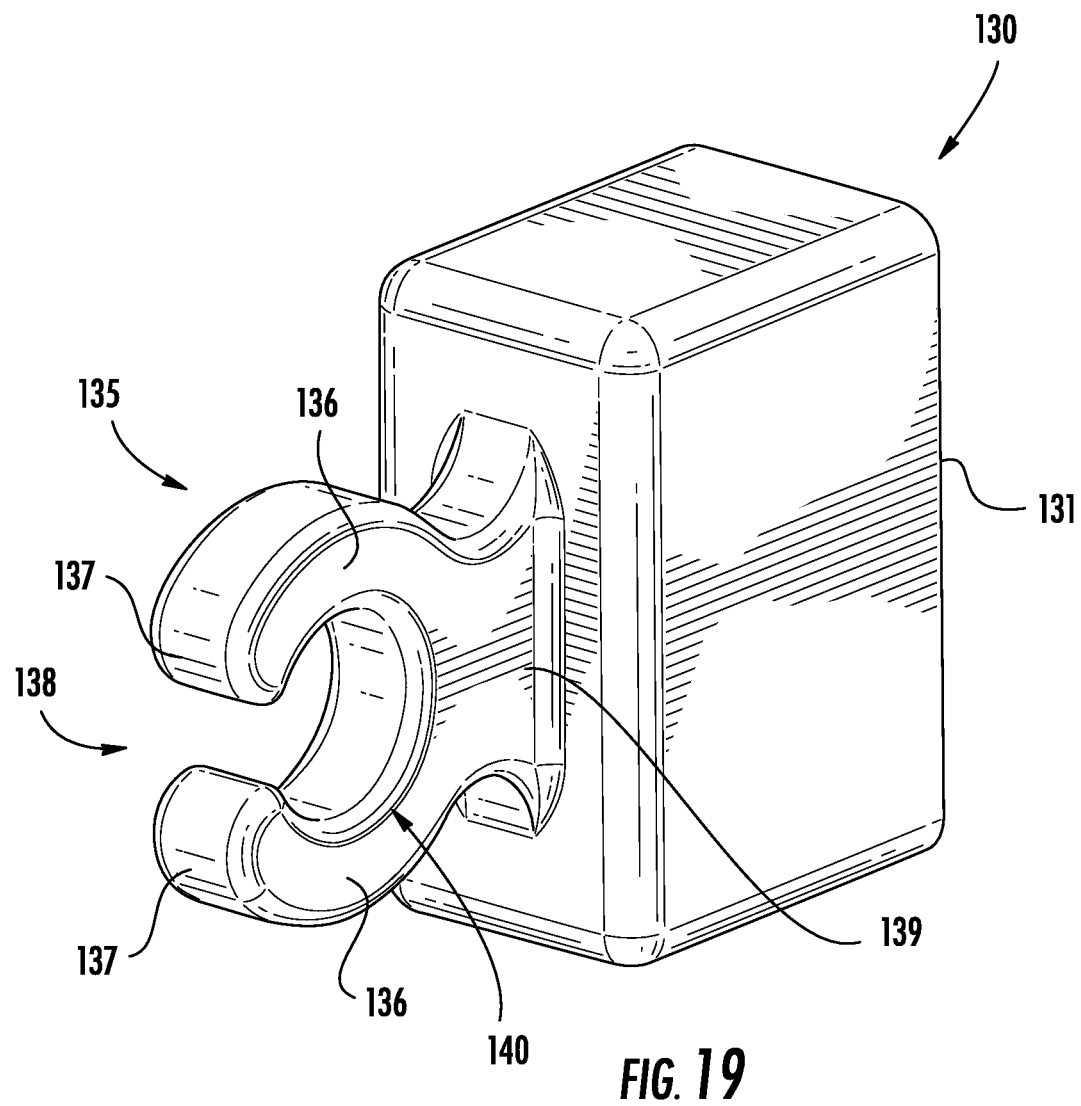
FIG. 19 is a perspective view of a dust cover for use with the optical fiber assembly of FIG. 18.
Figure 20:
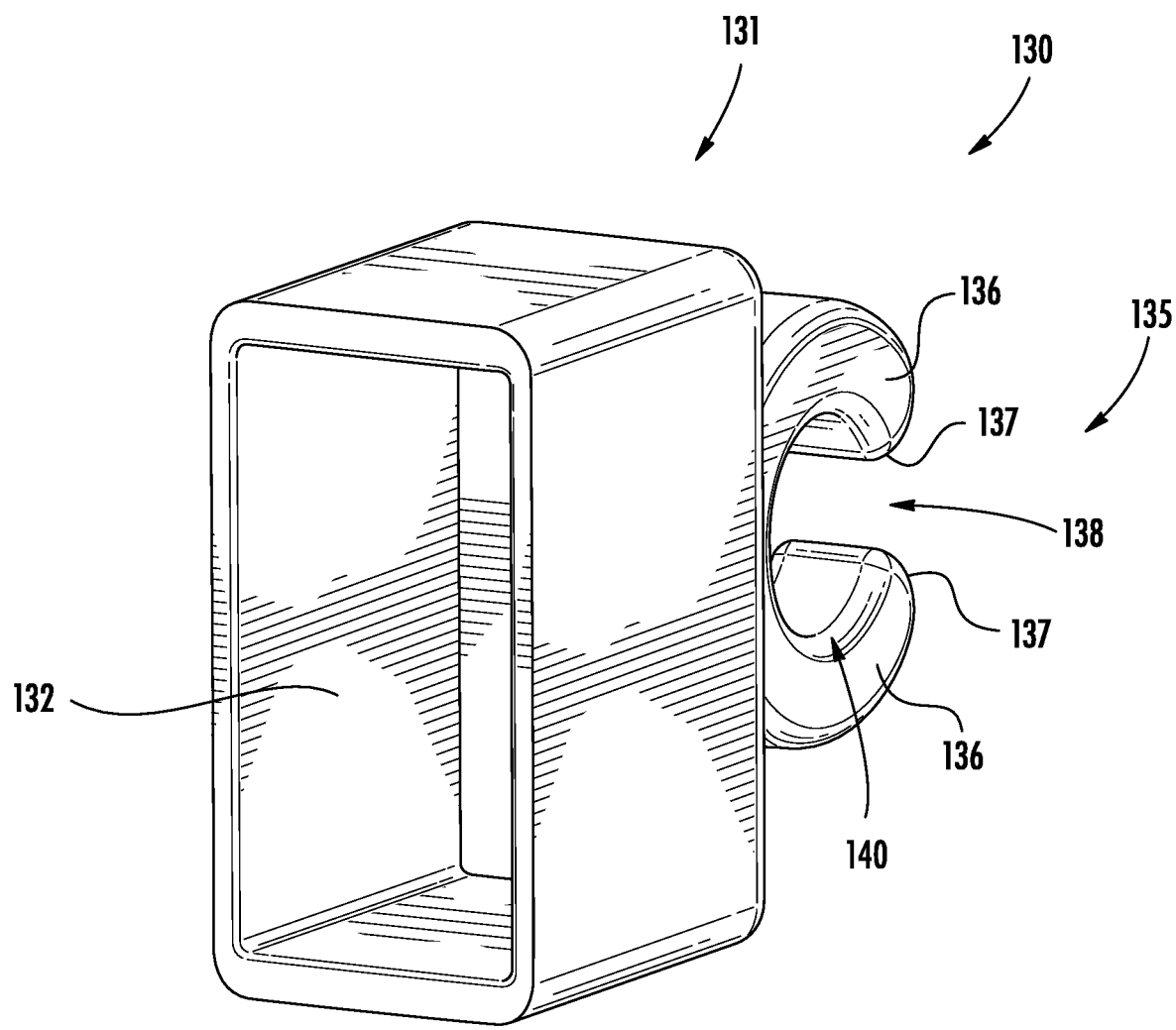
FIG. 20 is a perspective view of the dust cover of FIG. 19 but from a different perspective.

In another aspect of the disclosure, the receptacle 38 of the optical housing assemblies 11 may include dust covers or caps 130 (FIGS. 18-20) to enclose and seal each receptacle to reduce the likelihood that dust and other undesired debris will enter the receptacle. The dust cover 130 includes a receptacle sealing portion 131 and a cable engaging section 135. The receptacle sealing portion 131 is depicted with a generally rectangular opening 132 that slides onto the locking portion 39 of the adapter insert 40 to seal the receptacle 38.

The cable engaging section 135 may include a pair of generally arcuate legs 136 with distal ends 137 that are spaced apart to define a cable receiving opening 138. A leg or base member 139 may space the cable engaging section 135 from the receptacle sealing portion 131. The arcuate legs 136 and the base member 139 may define a circular receptacle 140 that is accessible through the cable receiving opening 138. The dust cover 130 may be formed from a flexible material such as a polymer or resin so that the arcuate legs 136 are flexible. The cable receiving opening 138 and the circular receptacle 140 may be dimensioned so that dust cover 130 may be pushed onto a cable of an optical fiber cable assembly to removably or releasably retain the cover on the cable and reduce the likelihood that the cover will be lost. As such, the dust cover may be removably or releasably secured to the adapter insert or housing to seal the receptacle 38 and then removably or releasably secured to a cable assembly 200 that is inserted into the receptacle. By configuring the dust cover 130 with the cable engaging section 135, the likelihood of losing the dust cover is reduced and it is retained in proximity to the receptacle 38 from which it was removed.

In an alternate embodiment, the receptacle sealing portion 131 depicted with a rectangular opening 132 may be replaced with a plug member (not shown) for use in instances in which it is desirable to seal the receptacles 38 of the optical housing assembly 11 by inserting the plug members into the receptacles of the housing assembly rather than using a sealing portion that fits over the receptacle.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

It will be appreciated that the foregoing description provides examples of the disclosed system and technique.

However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An optical housing assembly comprising:
a housing member having a first face and a second face, the first face having a plurality of first cavities and the second face having a plurality of second cavities, each of the first cavities being aligned with one of the second cavities, each of the first cavities and each of the second cavities having a housing locking member and a ramp on each of an upper and a lower wall, the housing member including a wall with an opening between each pair of aligned first and second cavities;
a plurality of first adapter inserts, each first adapter insert having a first mounting section inserted into one of the first cavities, the insertion guided by the ramps on the upper and lower walls of the cavity, a first receptacle having protruding vertical sidewalls configured to receive a first optical fiber connector therein, and a first connector latching member configured to interact with a first latching structure of the first optical fiber connector; and
a plurality of second adapter inserts, each second adapter insert having a second mounting section inserted into one of the second cavities, the insertion guided by the ramps on the upper and lower walls of the cavity, a second receptacle having protruding vertical sidewalls configured to receive a second optical fiber connector therein, and a second connector latching member configured to interact with a second latching structure of the second optical fiber connector;
each of the first adapter inserts and each of the second adapter inserts having an adapter insert locking member associated with their respective mounting sections, each adapter insert locking member being configured to interact with one of the housing locking members to lock the adapter inserts in respective ones of the receptacles of the housing.

2. The assembly of claim 1, wherein the opening between each pair of aligned first and second cavities is rectangular and substantially smaller than the first receptacle and the second receptacle.

3. The assembly of claim 1, wherein one of the housing locking members and the adapter insert locking members has an opening and another of the housing locking members and the adapter insert locking members has a projection extending into the opening.

4. The assembly of claim 1, wherein the first receptacle of each adapter insert is located within the first cavity associated with the adapter insert.

* * * * *